United States Patent
Tsumura

(10) Patent No.: US 8,427,423 B2
(45) Date of Patent: Apr. 23, 2013

(54) INFORMATION INPUT DEVICE

(75) Inventor: Masahiro Tsumura, Yokohama (JP)

(73) Assignee: Touch Panel Systems K.K., Yokohama (JP)

( * ) Notice: Subject to any disclaimer, the term of this patent is extended or adjusted under 35 U.S.C. 154(b) by 498 days.

(21) Appl. No.: 11/795,349

(22) PCT Filed: Jan. 13, 2006

(86) PCT No.: PCT/JP2006/000791
§ 371 (c)(1), (2), (4) Date: Aug. 6, 2007

(87) PCT Pub. No.: WO2006/077949
PCT Pub. Date: Jul. 27, 2006

(65) Prior Publication Data
US 2008/0100594 A1 May 1, 2008

(30) Foreign Application Priority Data
Jan. 14, 2005 (JP) .................... 2005-007093

(51) Int. Cl.
*G09G 5/00* (2006.01)

(52) U.S. Cl.
USPC ............... 345/156; 345/173; 345/177

(58) Field of Classification Search .......... 345/156, 345/177, 173
See application file for complete search history.

(56) References Cited

U.S. PATENT DOCUMENTS

| | | | |
|---|---|---|---|
| 4,827,410 A | 5/1989 | Corren | |
| 5,518,078 A | 5/1996 | Tsujioka et al. | |
| 5,589,856 A | 12/1996 | Stein et al. | |
| 5,594,471 A | 1/1997 | Deeran et al. | |
| 5,708,461 A | 1/1998 | Kent | |
| 5,815,141 A | 9/1998 | Phares | |
| 5,854,450 A * | 12/1998 | Kent | 178/18.04 |
| 6,088,024 A | 7/2000 | Yamagata | |
| 6,392,167 B1 * | 5/2002 | Nakagawa | 178/18.04 |
| 7,204,148 B2 | 4/2007 | Tanaka et al. | |

(Continued)

FOREIGN PATENT DOCUMENTS

| | | |
|---|---|---|
| CN | 1527988 A | 9/2004 |
| EP | 0190734 A1 | 8/1986 |

(Continued)

OTHER PUBLICATIONS

Supplementary European Search Report for European Application No. EP 06 70 0844, mailed Apr. 27, 2009.

(Continued)

*Primary Examiner* — Amare Mengistu
*Assistant Examiner* — Joseph G Rodriguez
(74) *Attorney, Agent, or Firm* — Alston & Bird LLP

(57) ABSTRACT

An information input device (1) includes a touch panel (2), an image display (6), and a sensor section (12) for detecting touched contact positions on the touch panel (2). A detection region of the touch panel (2), surrounded by the sensor section (12), is divided into a rectangular main region (10) and at least one sub region (14), which has a smaller area than the main region (10), is separated from the main region (10), and extends along at least one edge thereof. Images are displayed by the image display (6) and contact positions are detected in the main region (10). Only the presence or absence of contact is detected in the at least one sub region (14).

9 Claims, 13 Drawing Sheets

U.S. PATENT DOCUMENTS

| | | | |
|---|---|---|---|
| 2002/0126102 A1* | 9/2002 | Redmayne | 345/173 |
| 2003/0043113 A1* | 3/2003 | Itoh | 345/156 |
| 2005/0156911 A1* | 7/2005 | Tanaka et al. | 345/177 |

FOREIGN PATENT DOCUMENTS

| | | | |
|---|---|---|---|
| JP | 5-127826 A | 5/1993 | |
| JP | 7-110742 A | 4/1995 | |
| JP | 10-504414 A | 4/1998 | |
| JP | 11-312054 A | 9/1999 | |
| JP | 11-312054 A | 11/1999 | |
| JP | 2004-164289 A | 6/2004 | |
| WO | WO 01/40923 A1 | 6/2001 | |

OTHER PUBLICATIONS

International Search Report for International Application No. PCT/JP2006/300791.

English translation of Jun. 22, 2010 Japanese Patent Office rejection in JP 2005-007093.

English translation of Jun. 22, 2010 JPO office action in JP 2005-007093.

* cited by examiner

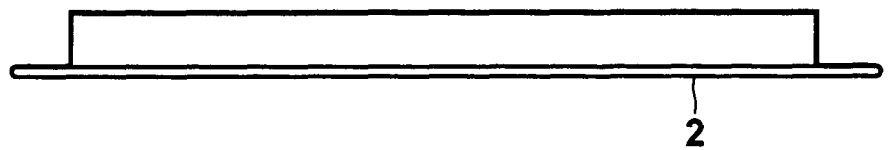
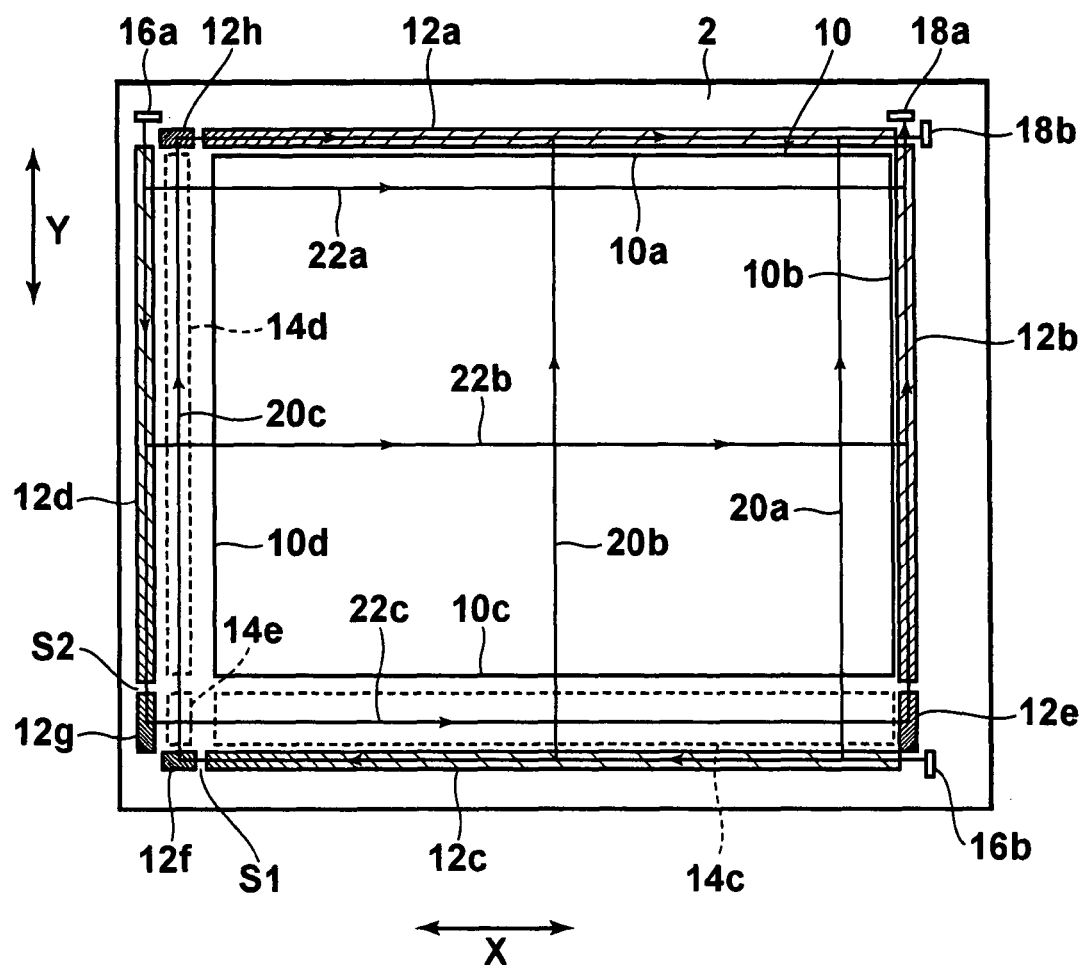

X AXIS SIGNAL LEVEL

Y AXIS SIGNAL LEVEL

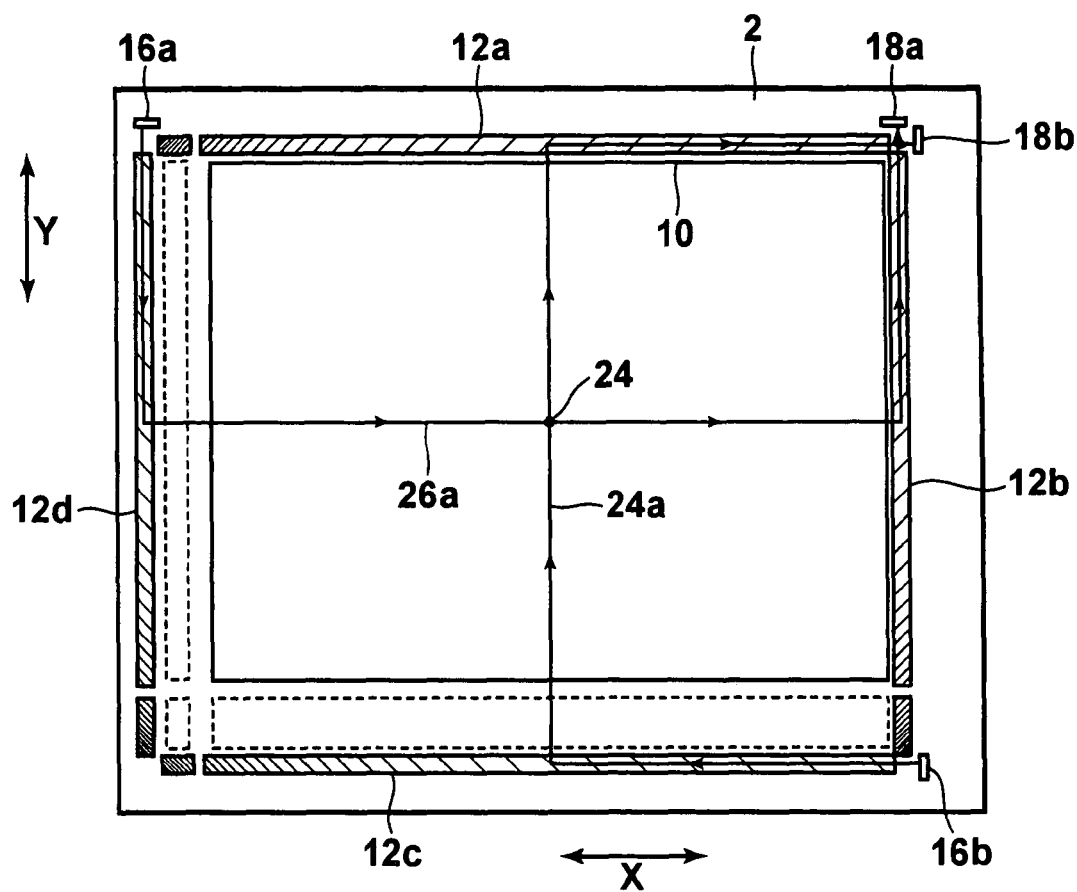

X AXIS SIGNAL LEVEL

Y AXIS SIGNAL LEVEL

X AXIS SIGNAL LEVEL

Y AXIS SIGNAL LEVEL

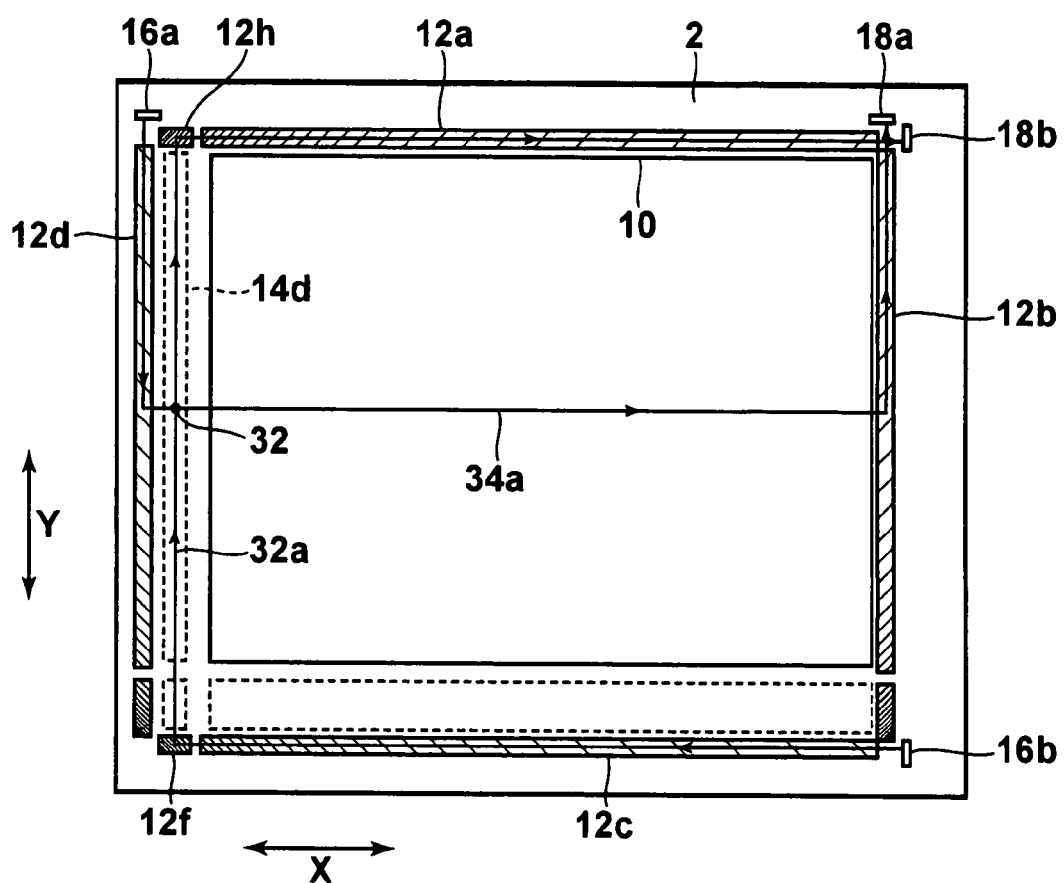

X AXIS SIGNAL LEVEL

Y AXIS SIGNAL LEVEL

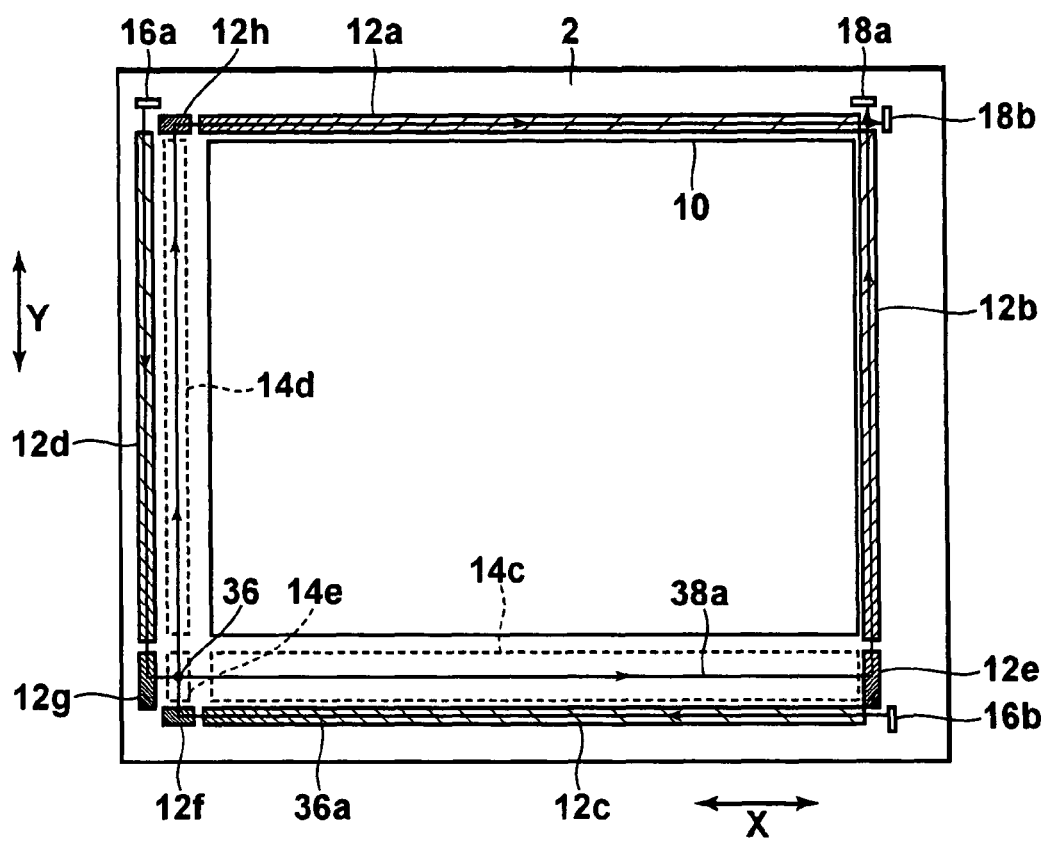

X AXIS SIGNAL LEVEL

Y AXIS SIGNAL LEVEL

X AXIS SIGNAL LEVEL

Y AXIS SIGNAL LEVEL

INFORMATION INPUT DEVICE

TECHNICAL FIELD

The present invention relates to an information input device that utilizes a touch panel. More particularly, the present invention relates to an information input device having a main region and sub regions, as regions within which contact with the surface of the touch panel is detected.

BACKGROUND ART

There are known information input devices that utilize touch panels. Examples of such information input devices include those utilized as ATM's, and those utilized at ticket vending machines at train stations. There is also a known table shaped touch panel, as a newer type of information input device (refer to FIG. 2 and FIG. 3 of International Publication No. WO01/40923, for example). In this touch panel, images are displayed within an area surrounded by a sensor section of the touch panel. The touch panel is configured to accept input of necessary information by touching (contacting) portions of the image display area. The table shaped touch panel is used in cases that a plurality of people surround the table to conduct meetings and necessary information is to be displayed during the meetings, for example. The position of a finger that touches the touch panel is detected by the sensor section, and input of information corresponding to the position is enabled. At the same time, desired information is displayed within the image display area of the touch panel.

There is another conventional type of touch panel, in which a button panel created by software and a main panel are displayed on an LCD (Liquid Crystal Display) (refer to FIG. 4 of Japanese Unexamined Patent Publication No. 7(1995)-110742, for example). In this type of touch panel, detection of contact positions is enabled in both the button panel region and the main panel region.

In addition, the present applicant has proposed an acoustic type contact detecting apparatus as a touch panel (refer to FIG. 1 of Japanese Unexamined Patent Publication No. 2004-164289).

The conventional touch panels disclosed in International Publication No. WO01/40923 and Japanese Unexamined Patent Publication No. 2004-164289 are not provided with external switches, such as those for booting up a PC (Personal Computer) or for adjusting the screens thereof. The touch panel disclosed in Japanese Unexamined Patent Publication No. 7-110742 is provided with the button panel in addition to the main panel. Therefore, input corresponding to operations of external switches can be performed by operating the button panel. However, a portion of the display surface of the LCD is utilized as the button panel, and accordingly the area of the display region for necessary information is decreased. If a display region having a sufficiently large area is to be secured, there is a problem that the entire device will become large.

SUMMARY OF THE INVENTION

The present invention has been developed in view of the foregoing circumstances. It is an object of the present invention to provide the functions of hardware external switches within a touch panel in a streamlined manner, while maintaining the area of a display region of an image display.

It is another object of the present invention to provide a plurality of sub regions within a touch panel with a simple structure.

It is still another object of the present invention to provide an information input device having a streamlined outward appearance, without bezels at the periphery of a touch panel.

An information input device of the present invention comprises:

a touch panel;

an image display; and a sensor section for detecting contact positions on the touch panel; and is characterized by:

a detection region of the touch panel surrounded by the sensor section being divided into a rectangular main region and at least one sub region, which has a smaller area than the main region, is separated from the main region, and extends along at least one edge thereof;

images being displayed by the image display and contact positions being detected in the main region; and only the presence or absence of contact being detected in the at least one sub region.

A configuration may be adopted, wherein the at least one sub region of the information input device of the present invention comprises:

a first sub region, which is separated from, adjacent to, and extends along a first edge of the main region;

a second sub region, which is separated from, adjacent to, and extends along a second edge of the main region perpendicular to the first edge; and a third sub region, which is positioned at an intersection of the directions in which the first edge and the second edge extend, and separated from the first sub region and the second sub region.

The touch panel may be an acoustic type touch panel; and the sensor section may comprise reflective arrays surrounding the detection region, for reflecting acoustic waves. The reflective arrays may be separated from both the main region and the at least one sub region, or from one of the main region and the at least one sub region.

It is preferable for the at least one sub region to be utilized as at least one switch. Detection of operation of the at least one switch may be performed by a controller.

According to the information input device of the present invention, the detection region of the touch panel, surrounded by the sensor section, is divided into the rectangular main region and at least one sub region having a smaller area than the main region. Images are displayed by the image display and contact positions are detected in the main region, while only the presence or absence of contact is detected in the at least one sub region. Therefore, a display region of the image display is secured in the touch panel, and the functions of external switches for hardware can be provided within the at least one sub region in a streamlined manner.

The at least one sub region may comprise: the first sub region, which is separated from, adjacent to, and extends along the first edge of the main region; the second sub region, which is separated from, adjacent to, and extends along the second edge of the main region perpendicular to the first edge; and the third sub region, which is positioned at an intersection of the directions in which the first edge and the second edge extend, and separated from the first sub region and the second sub region. In this case, three external switches can be obtained by a simple structure.

The touch panel may be an acoustic type touch panel; and the sensor section may comprise the reflective arrays surrounding the detection region, for reflecting acoustic waves. In this case, an information input device having a sleek outward appearance without bezels at the periphery thereof can be obtained. In addition, functions equivalent to those of a "Shift" key and a "Ctrl" key of a PC keyboard, or equivalent to that of right clicking a PC mouse, can be obtained.

The reflective arrays may be separated from both the main region and the at least one sub region, or from one of the main region and the at least one sub region. In this case, received signals are clearly separated between the main region and the at least one sub region, facilitating signal processes.

BRIEF DESCRIPTION OF THE DRAWINGS

FIG. 2A is a plan view of a touch panel as an example of the present invention, having the same concept as the information input device of FIG. 1.

FIG. 2B is a front view of the touch panel as an example of the present invention, having the same concept as the information input device of FIG. 1.

FIG. 4 is a front view that illustrates signal paths which are blocked when the center of a main region is touched.

FIG. 8 is a front view that illustrates signal paths which are blocked when the center of a sub region is touched.

FIG. 10 is a front view that illustrates signal paths which are blocked when the center of a sub region is touched.

DETAILED DESCRIPTION OF THE INVENTION

Figure 1:
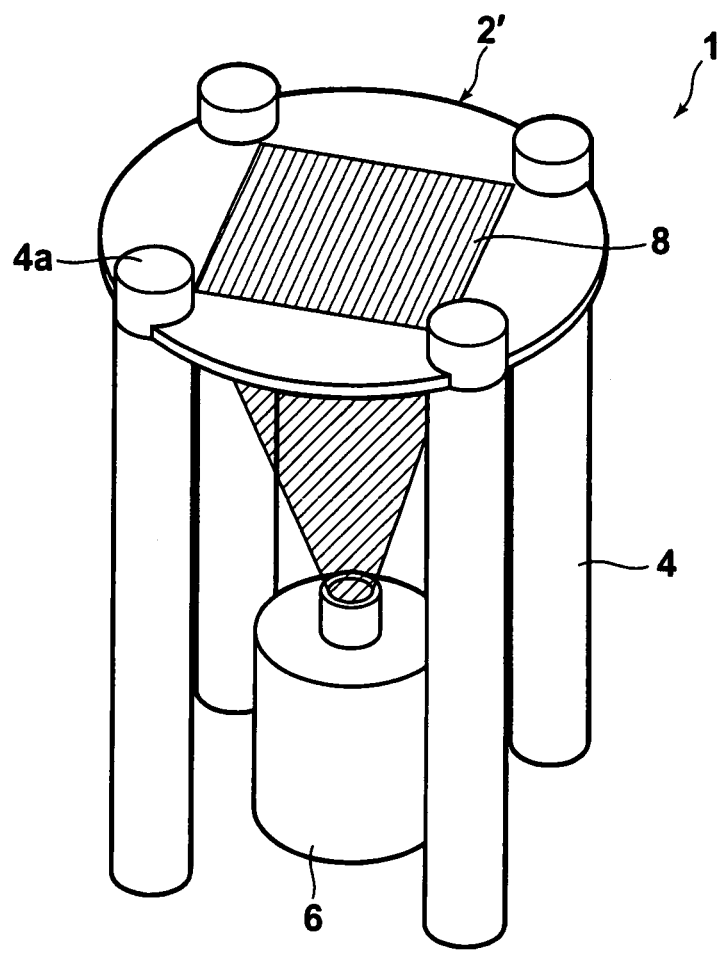
FIG. 1 is a schematic perspective view that illustrates the concept of an information input device according to a first embodiment of the present invention.

Hereinafter, an information input device according to an embodiment of the present invention will be described with reference to the attached drawings. FIG. 1 is a schematic perspective view that illustrates the concept of an information input device 1 (hereinafter, simply referred to as "device 1") according to a first embodiment of the present invention. The device 1 has an outer appearance similar to that of the information input device disclosed in the aforementioned document WO01/40923A1, of which the applicant is the present applicant. The device 1 comprises: a circular touch panel 2'; and four legs 4 that support the touch panel 2'. A projector 6 is provided beneath the touch panel 2' so as to project images onto the touch panel 2' from below. Note that a controller (control section) for controlling the projected images and a computer section are omitted from FIG. 1. A screen 8 which is projected onto the touch panel 2' is rectangular in shape. The touch panel 2' is of the ultrasonic type. Transmitting transducers 16 and receiving transducers 18 (refer to FIG. 2B), which will be described later, and electrical cables (not shown) for connecting the transducers 16 and 18 to the controller and the like are housed within protective covers 4a of the legs 4.

Next, a rectangular touch panel having the same concept as the circular touch panel 2' of FIG. 1 will be described in detail with reference to FIGS. 2A and 2B. FIG. 2A and FIG. 2B illustrate a touch panel 2 according to an embodiment of the present invention, wherein FIG. 2A is a plan view, and FIG. 2B is a front view. The aforementioned screen 8, which has been projected by the projector 6, corresponds to a rectangular main region 10. In the following description, the directions up, down, left, and right will be the directions as illustrated in FIG. 2B, for the sake of convenience. In addition, the horizontal direction within FIG. 2B will be referred to as "the X axis direction", and the vertical direction within FIG. 2B will be referred to as "the Y axis direction".

A reflective array 12a, which is separated from and parallel to an upper edge 10a of the main region 10, is formed in the vicinity of the upper edge 10a at substantially the same length thereof. The reflective array 12a reflects surface acoustic waves (acoustic waves) transmitted from a transmitting transducer 16b, changes the direction of propagation thereof at a 90° angle, and leads them to a receiving transducer 18b. The reflective array 12a is an elongate region formed by a great number of ridges, which are diagonal with respect to the reflecting direction and are extremely low in height. Only a small number of ridges are illustrated in FIG. 2B, in order to illustrate the paths if surface acoustic waves more clearly.

However, the ridges are densely provided in actuality. A similar reflective array 12b, which is separated from and parallel to a right edge 10b of the main region 10, is formed in the vicinity of the right edge 10b at substantially the same length thereof.

A sub region 14c (first sub region) is formed along a lower edge 10c of the main region 10, at a position in the vicinity of the lower edge 10c. The sub region 14c is wider than the width of the reflective arrays 12a and 12b, substantially of the same length as the lower edge 10c, and has an area smaller than that of the main region 10. A sub region 14d (second sub region) is formed along a left edge 10d of the main region 10, at a position in the vicinity of the left edge 10d. Further, a sub region 14e (third sub region) having a small area is formed at an intersection of the directions in which the sub region 14c and the sub region 14d extend, separated from the sub regions 14c and 14d. The sub regions 14c, 14d, and 14e are positioned outside the main region 10, which corresponds to the screen 8 formed by the projector 6. Accordingly, the area of the region of the projected screen is not decreased by the sub regions 14c, 14d, and 14e. The sub regions 14c, 14d, and 14e are separated from each other in order to prevent contact at the borders therebetween, thereby facilitating detection, or in order to prevent erroneous operations. Reflective arrays 12c and 12d, which are separated from and parallel to the sub regions 14c and 141, respectively, are formed at the sides of the sub regions 14c and 14d opposite the main region 10 at substantially the same lengths thereof, respectively. Note that the sub regions 14c, 14d, and 14e will be collectively referred to as sub regions 14.

Next, reflective arrays 12e, 12f, 12g, and 12h, which are formed in the vicinities of the first, second, and third sub regions 14c, 14d, and 14e such that surface acoustic waves propagate within the sub regions 14, will be described. The reflective array 12e is of substantially the same length as the width of the sub region 14c, and is provided as an adjacent and separated extension of the reflective array 12b at the lower end thereof. The reflective array 12f is provided as an adjacent and separated extension of the reflective array 12c at the left end thereof. The reflective array 12f is at least of a length corresponding to the widths of the sub regions 14d and 14e. The reflective array 12g is of a length corresponding to the width of the sub region 14c, and is provided at an intersection of the directions in which the reflective array 12d and the sub region 14c extend. The reflective array 12h is provided adjacent to the upper end of the sub region 14d, as a separated extension of the reflective array 12a. The aforementioned reflective arrays 12a through 12h will be collectively referred to as "reflective arrays 12" (sensor section). The reflective arrays 12 are configured as a whole to surround a region that includes the main region 10 and the sub regions 14, that is, a detection region. In other words, the detection region, which is surrounded by the reflective arrays 12, is divided into the main region 10 and the sub regions 14.

A transmitting transducer 16a is provided in the vicinity of the upper end of the reflective array 12d, at a position separated from the upper end of the reflective array 12d and along the direction in which the reflective array 12d extends. A transmitting transducer 16a is provided in the vicinity of the upper end of the reflective array 12d, at a position separated from the upper end of the reflective array 12d and along the direction in which the reflective array 12d extends.

Another transmitting transducer 16b is provided in the vicinity of the right end of the reflective array 12c, at a position along the direction in which the reflective array 12c extends. A receiving transducer 18a is provided in the vicinity of the upper end of the reflective array 12b, at a position along the direction in which the reflective array 12b extends. Another receiving transducer 18b is provided in the vicinity of the right end of the reflective array 12a, at a position along the direction in which the reflective array 12a extends.

Next, how surface acoustic waves which are transmitted from the transmitting transducers 16 (16a, 16b) propagate within the detection region will be described. First, the surface acoustic waves which are transmitted from the transducer 16b and caused to propagate in the X direction, that is, along the reflective array 12, propagate across the entire detection region at substantially the same intensities, by being reflected at 90° angles by the reflective array 12c. For example, the surface acoustic waves pass through a path 20a within the detection region at a position comparatively close to the transmitting transducer 16b, pass through a path 20b at an intermediate position, and pass through a path 20c at a position comparatively far from the transmitting transducer 16b. The directions of these paths are changed at 90° angles by the reflective array 12a, and the surface acoustic waves are caused to propagate until they reach the receiving transducer 18b. Note that the paths 20a, 20b, and 20c are merely examples, and the entirety of the detection region is substantially covered by the surface acoustic waves propagating through a great number of paths. The relationship between the paths of received signals and the intensities of the received signals will be described with reference to FIGS. 3A and 3B.

Figure 3A:
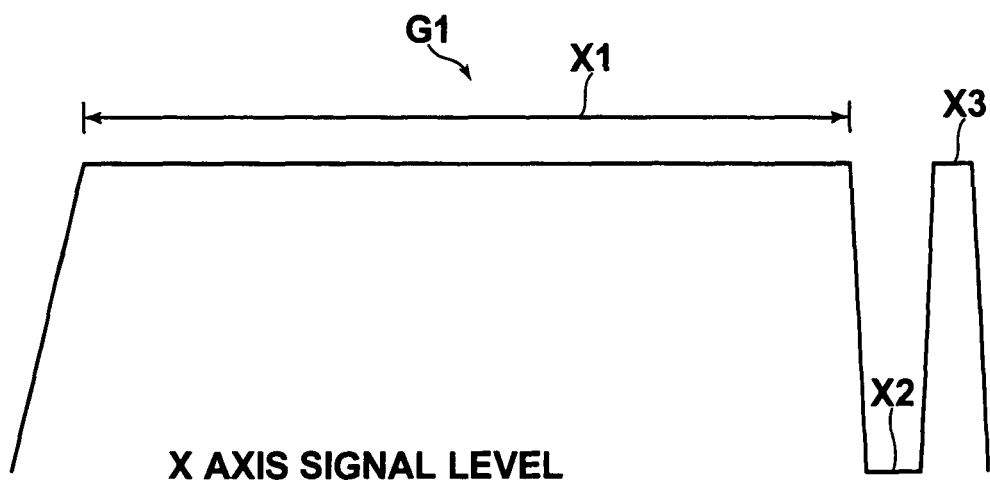
FIG. 3A is a graph that illustrates the relationship between received intensities and propagating paths, in the case that surface acoustic waves emitted from a transmitting transducer propagate along the X axis direction when there is nothing in contact with a detection region.
Figure 3B:
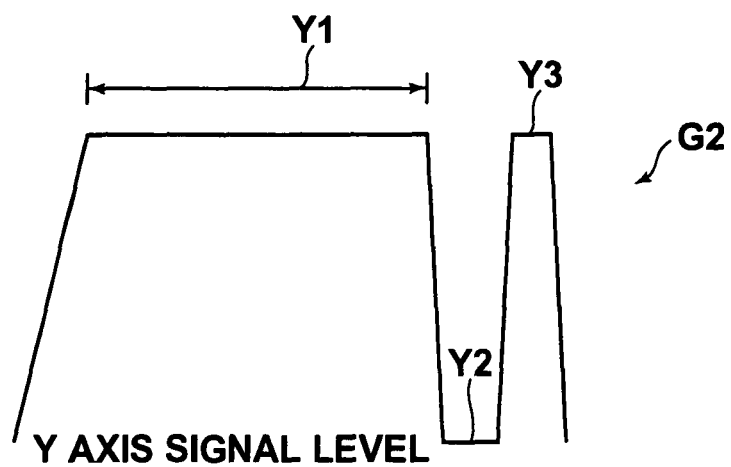
FIG. 3B is a graph that illustrates the relationship between received intensities and propagating paths, in the case that surface acoustic waves emitted from the transmitting transducer propagate along the Y axis direction when there is nothing in contact with the detection region.

FIGS. 3A and 3B are graphs that illustrate the relationship between received intensities of surface acoustic waves emitted from the transmitting transducers 16 and propagating paths, when no fingers are touching the detection region. FIG. 3A illustrates a case in which the surface acoustic waves propagate in the X direction, and FIG. 3B illustrates a case in which the surface acoustic waves propagate in the Y direction. Note that in FIGS. 3A and 3B, the horizontal axis represents time or the length of the paths, and the vertical axis represents received signal intensities. The flat portion indicated by X1 in the graph G1 of FIG. 3A indicates the intensity of surface acoustic waves that propagate across the main region 10. It can be seen that the surface acoustic waves propagate across the main region 10 at a uniform intensity. The depression indicated by X2, where no signal is being received, corresponds to a gap S1 between the reflective array 12c and the reflective array 12f, illustrated in FIG. 2B. The surface acoustic waves that pass through the gap Si and continue to propagate in the X direction are reflected by the reflective array 12f, and appear as a narrow portion X3 having the same intensity as the portion X1.

Next, surface acoustic waves that are caused to propagate in the Y direction will be described. Surface acoustic waves, which are emitted from the transmitting transducer 16a along the reflective array 12d propagate to the receiving transducer 18a via paths 22a, 22b, and 22c illustrated in FIG. 2B, for example. The intensities of the surface acoustic waves at this time are illustrated in FIG. 3B. The flat portion of graph G2 indicated by Y1 represents the intensity of the surface acoustic waves that pass through the main region 10, along the paths 22a, 22b, and the like. The depression indicated by Y2 corresponds to a gap S2 between the reflective array 12d and the reflective array 12g. A portion Y3, having the same intensity as the portion Y1, represents the intensity of received surface acoustic waves, which have passed through the gap S2 and are reflected by the reflective array 12g.

Figure 5A:
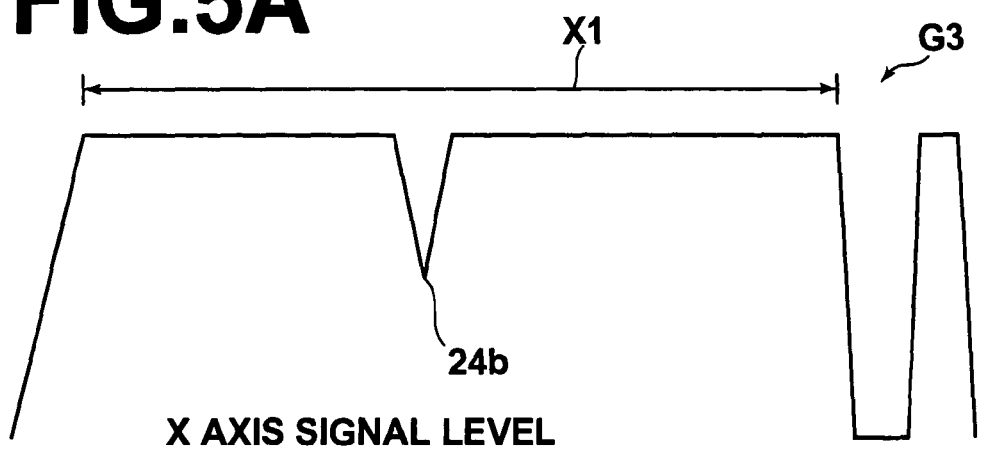
FIG. 5A is a graph that illustrates the shape of received intensities of surface acoustic waves in the case that the center of the main region is touched, and indicates a detected position in the X axis direction.
Figure 5B:
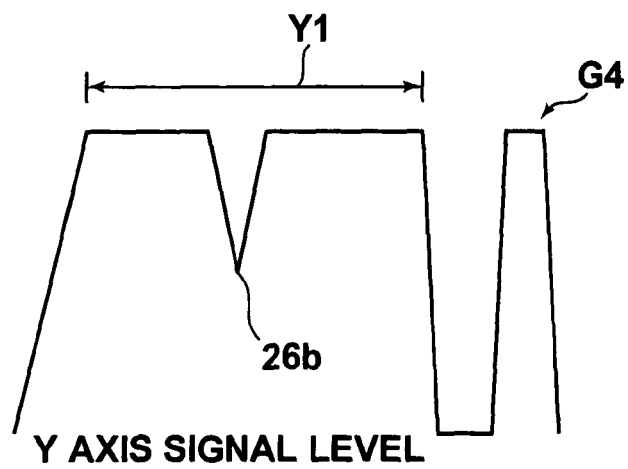
FIG. 5B is a graph that illustrates the shape of received intensities of surface acoustic waves in the case that the center of the main region is touched, and indicates a detected position in the Y axis direction.

Next, a case in which an object contacts the main region 10 will be described with reference to FIG. 4, FIG. 5A, and FIG. 5B. FIG. 4 is a front view that illustrates signal paths which are blocked when the center of the main region 10 is touched. FIGS. 5A and 5B are graphs that illustrate the shapes of received intensities of surface acoustic waves in the case that the center of the main region 10 is touched, and indicate detected positions in the X axis direction and in the Y axis direction, respectively. As illustrated in FIG. 4, in the case that a contact position 24 at the center of the main region 10 is touched, surface acoustic waves that propagate along paths 24a and 26a are blocked. That is, the surface acoustic waves that propagate along the path 24a, from among the surface acoustic waves emitted in the X axis direction from the transmitting transducer 16b, are blocked, and the drop in the received signal appears as a depression 24b in graph G3 of FIG. 5A. The depression 24b appears at the substantial center of a region X1. That is, this indicates that the touched contact position is at the center of the X coordinate of the main region 10. At the same time, the surface acoustic waves that propagate along the path 26a, from among the surface acoustic waves emitted in the Y axis direction from the transmitting transducer 16a, are blocked, and the drop in the received signal appears as a depression 26b at the center of a region Y1 in graph G4 of FIG. 5B. The detection results indicated by the graphs G3 and G4 are calculated by a controller (not shown), and it is recognized that the center of the main region 10 has been touched. That is, the touched contact position 24 is specified by the combination of X coordinates and Y coordinates.

The steps which are undertaken for a desired image or the like to be displayed when the main region 10 is touched as illustrated in FIG. 4 are as follows. First, the controller (not shown) detects the touched contact position 24 from changes in signals received by the receiving transducers 18a and 18b. Next, the controller transmits the touched contact position 24 to a computer (not shown, hereinafter referred to as "PC") by serial transmission, and an application within the PC executes procedures to display an image. Thereby, desired data (image) is displayed in the main region 10.

Figure 6:
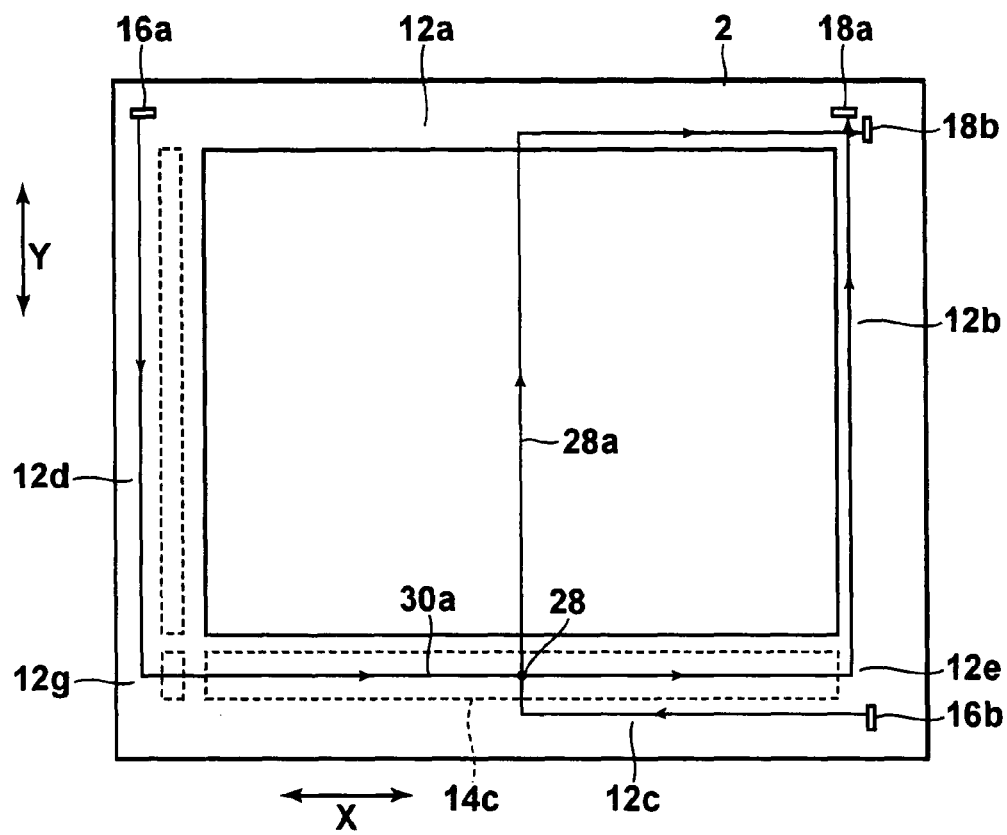
FIG. 6 is a front view that illustrates signal paths which are blocked when the center of a sub region is touched.
Figure 7A:
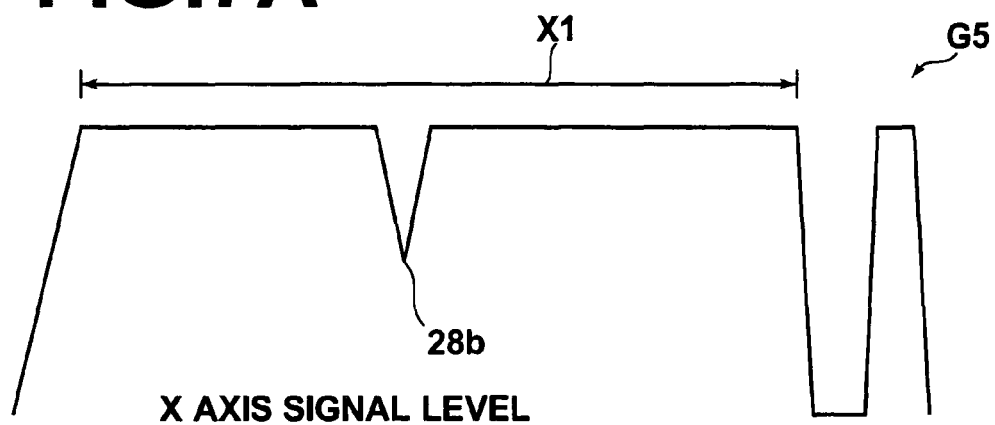
FIG. 7A is a graph that illustrates the shape of received intensities of surface acoustic waves in the case that the center of the sub region is touched, and indicates a detected position in the X axis direction.
Figure 7B:
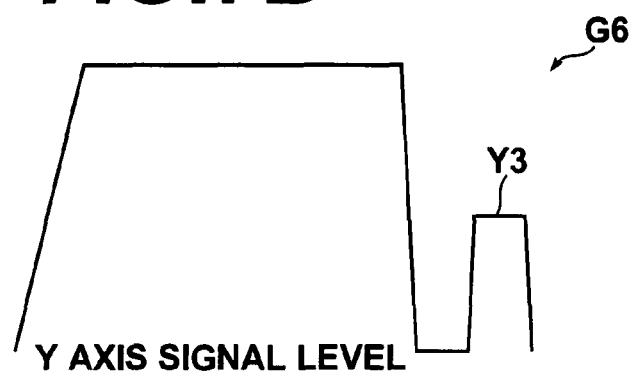
FIG. 7B is a graph that illustrates the shape of received intensities of surface acoustic waves in the case that the center of the sub region is touched, and indicates a detected position in the Y axis direction.

Next, a case in which the center of the sub region 14c is touched will be described with reference to FIG. 6, FIG. 7A, and FIG. 7B. FIG. 6 is a front view that illustrates signal paths which are blocked when the center of the sub region 14c is touched. FIGS. 7A and 7B are graphs that illustrate the shapes of received intensities of surface acoustic waves in the case that the center of the sub region 14c is touched, and indicate detected positions in the X axis direction and in the Y axis direction, respectively. As illustrated in FIG. 6, in the case that a contact position 28 at the center of the sub region 14c is touched, surface acoustic waves that propagate along a path 28a, from among the surface acoustic waves emitted in the X axis direction from the transmitting transducer 16b, are blocked. At the same time, surface acoustic waves that propagate along a path 30a, from among the surface acoustic waves emitted in the Y axis direction from the transmitting transducer 16a, are blocked. As illustrated in graph G5 of FIG. 7A, a drop in the received signal appears as a depression 28b at the center of a region X1. In addition, as illustrated in graph G6 of FIG. 7B, output within a region Y3 drops to approximately half that of the detected value indicated by region Y3 of FIG. 3B. It is recognized that the center of the sub region 14c has been touched, based on these detection results.

Figure 9A:
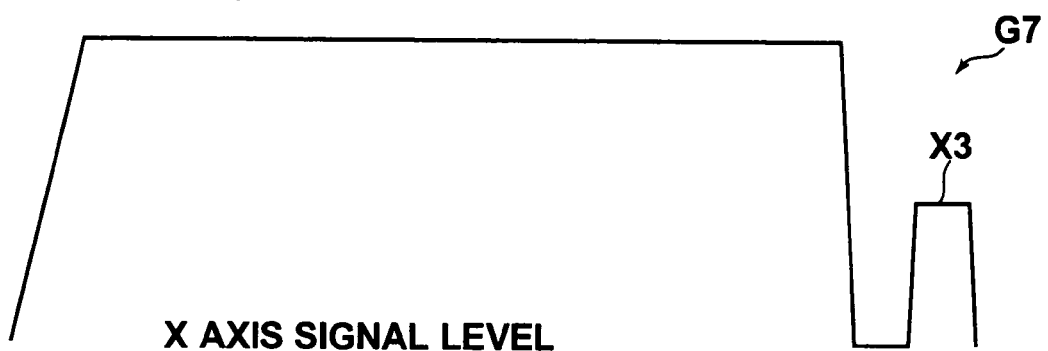
FIG. 9A is a graph that illustrates the shape of received intensities of surface acoustic waves in the case that the center of the sub region is touched, and indicates a detected position in the X axis direction.
Figure 9B:
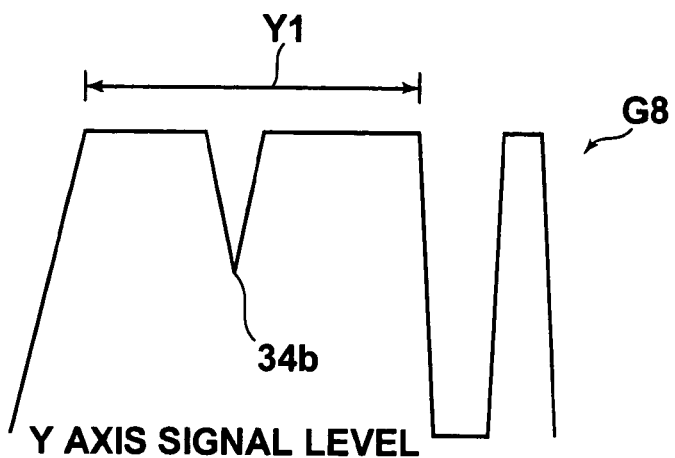
FIG. 9B is a graph that illustrates the shape of received intensities of surface acoustic waves in the case that the center of the sub region is touched, and indicates a detected position in the Y axis direction.

Next, a case in which a contact position 32 at the center of the sub region 14d is touched will be described with reference to FIG. 8, FIG. 9A, and FIG. 9B. FIG. 8 is a front view that illustrates signal paths which are blocked when the center of the sub region 14d is touched. FIGS. 9A and 9B are graphs that illustrate the shapes of received intensities of surface acoustic waves in the case that the center of the sub region 14d is touched, and indicate detected positions in the X axis direction and in the Y axis direction, respectively. In the case that the contact position 32 is touched, surface acoustic waves that propagate along a path 32a, from among the surface acoustic waves emitted in the X axis direction from the transmitting transducer 16b, are blocked. At the same time, surface acoustic waves that propagate along a path 34a, from among the surface acoustic waves emitted in the Y axis direction from the transmitting transducer 16a, are blocked. Output within a region X3 of graph G7 drops to approximately half, and a depression 34b is detected at the center of a region Y1 in graph G8. It is judged that the touched contact position 32 is at the center of the sub region 14d, based on these detection results.

Figure 11A:
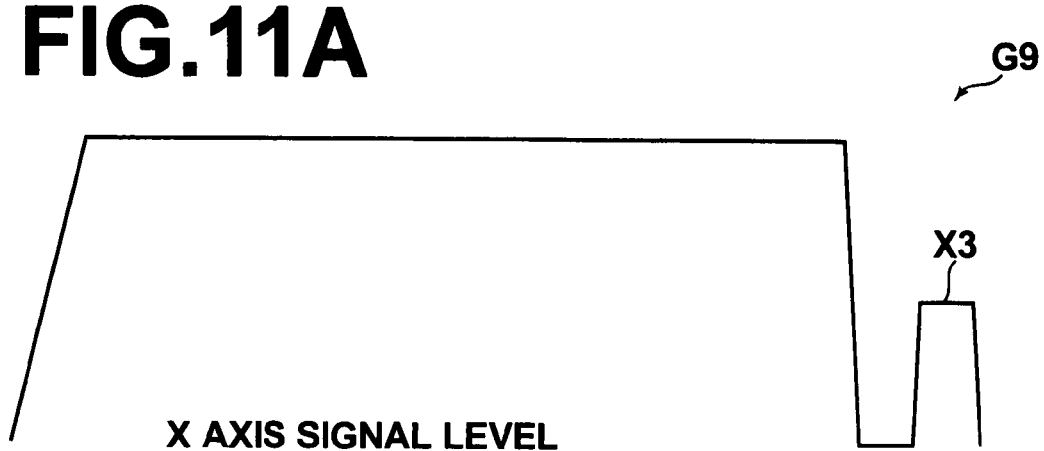
FIG. 11A is a graph that illustrates the shape of received intensities of surface acoustic waves in the case that the center of the sub region is touched, and indicates a detected position in the X axis direction.
Figure 11B:
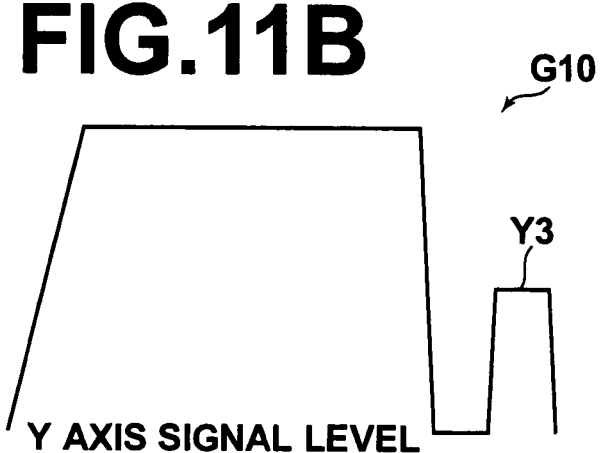
FIG. 11B is a graph that illustrates the shape of received intensities of surface acoustic waves in the case that the center of the sub region is touched, and indicates a detected position in the Y axis direction.

Next, a case in which a contact position 36 within the sub region 14e is touched will be described with reference to FIG. 10, FIG. 11A, and FIG. 11B. FIG. 10 is a front view that illustrates signal paths which are blocked when the center of the sub region 14e is touched. FIGS. 11A and 11B are graphs that illustrate the shapes of received intensities of surface acoustic waves in the case that the center of the sub region 14e is touched, and indicate detected positions in the X axis direction and in the Y axis direction, respectively. Paths 36a and 38b of surface acoustic waves, which are blocked by the contact position 36, appear as decreased received signal intensities within regions X3 and Y3 in graph G9 of FIG. 11A and graph G10 of FIG. 11B. It is judged that the touched contact position 36 is within the sub region 14e, based on these detection results.

The steps which are undertaken for images to be displayed when one of the sub regions 14 is touched in this manner are as follows. First, the controller (not shown) detects switching input based on the changes in received signals. Next, the controller transmits an ON/OFF signal for a corresponding switch, by I/O (input/output) output. Examples of ON switching include: booting up of the PC, displaying an OSD (On Screen Display) menu, starting a vertically inverted display function, and the like. The controller may directly perform the switching operation, instead of the ON/OFF signal being transmitted to the PC.

Figure 12:
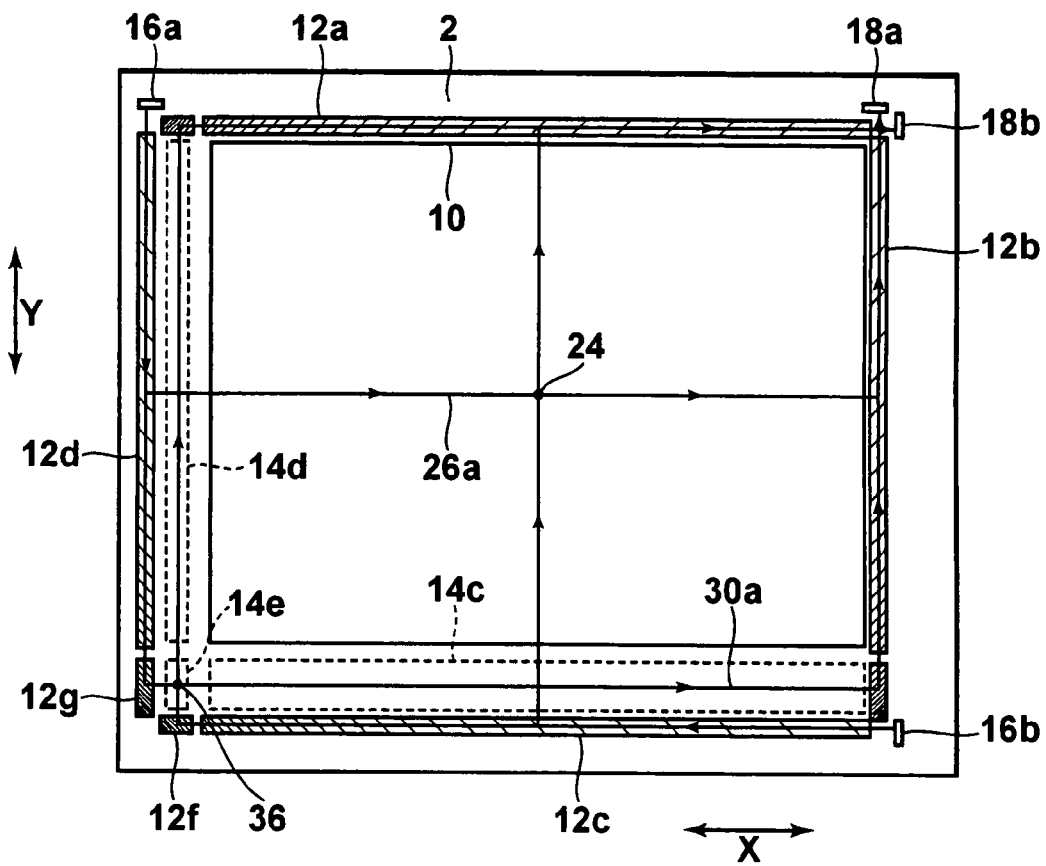
FIG. 12 is a front view that illustrates signal paths which are blocked when the center of the main region and the center of a sub region are touched simultaneously.
Figure 13A:
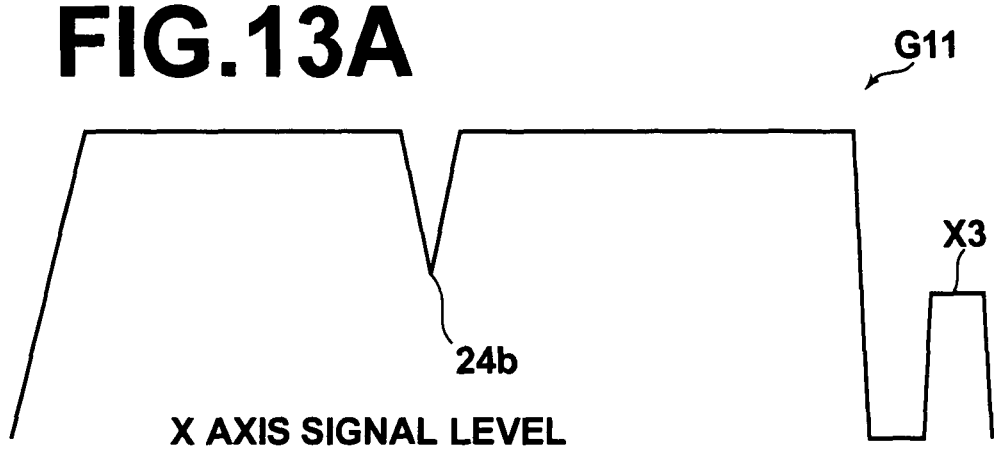
FIG. 13A is a graph that illustrates the shape of received intensities of surface acoustic waves in the case that the center of the main region and the center of the sub region are touched simultaneously, and indicates a detected position in the X axis direction.
Figure 13B:
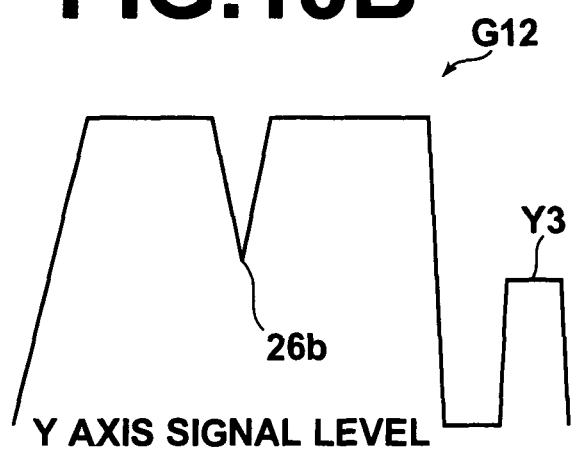
FIG. 13B is a graph that illustrates the shape of received intensities of surface acoustic waves in the case that the center of the main region and the center of the sub region are touched simultaneously, and indicates a detected position in the Y axis direction.

Next, a case in which two contact positions are touched simultaneously will be described with reference to FIG. 12, FIG. 13A, and FIG. 13B. FIG. 12 is a front view that illustrates signal paths which are blocked when the center of the main region 10 and the center of the sub region 14e are touched simultaneously. FIGS. 13A and 13B are graphs that illustrate the shapes of received intensities of surface acoustic waves in the case that the center of the main region 10 and the center of the sub region 14e are touched, and indicate detected positions in the X axis direction and in the Y axis direction, respectively. The touched contact positions 24 and 36 correspond to the contact positions 24 and 36 illustrated in FIG. 4 and FIG. 10. Accordingly, graphs G11 and G12 are combinations of graphs G3 and G4 of FIGS. 5A and 5B, and graphs G9 and G10 of FIGS. 11A and 11B. That is, graph G11 of FIG. 13A is a combination of graphs G3 and G9, and illustrate a state in which the depression 24b and the decrease in output within the range X3 are detected. In addition, graph G12 of FIG. 13B is a combination of graphs G4 and G10, and illustrate a state in which the depression 26b and the decrease in output within the range Y3 are detected. It is detected that two positions have been touched simultaneously, from the positions of the contact positions 24 and 36.

The operating steps in the case that the main region 10 and one of the sub regions 14 are touched simultaneously will be described. First, the controller detects the contact positions 24 and 36, and switching input within the sub region 14e, based on the changes in received signals. The controller transmits the contact positions to the PC as a right click of a PC mouse, by serial transmission. An application within the PC executes various procedures, which are performed when a PC mouse is right clicked. The touch panel 2 of the present embodiment is of the acoustic type, and therefore is capable of detected two contact points even when two points (two locations) are touched simultaneously. Accordingly, functions equivalent to those of a shift key and a control key of a PC keyboard, or equivalent to that of a right mouse click, can be obtained. This effect can also be obtained by an optical type touch panel.

As described above, contact positions are accurately detected no matter what position is touched within the detection region that includes the main region 10 and the sub regions 14, and desired data, that is, images, corresponding to the contact positions are displayed in the main region 10 of the touch panel 2. The sub regions 14 can be made to function as switches for booting up the PC, or as switches related to display of images within the main region 10 (a screen brightness adjustment switch, a vertically inverted display switch, for example). Alternatively, the sub regions 14 may have a function equivalent to right clicking a PC mouse (or depressing a shift key of a PC keyboard). The switching functions may be displayed in the sub regions 14 by printing or the like. A single function is allotted to each sub region 14*c*, 14*d*, and 14*e*, so as to enable users who surround the table (the apparatus 1) to touch the switches from any position. It is preferable for functions which are used frequently to be allotted to the sub regions 14*c* and 14*d*, which are comparatively larger. The apparatus 1 of the present invention is configured as has been described above. Therefore, mechanical switches can be eliminated, and in combination with the adoption of the acoustic wave type touch panel, the apparatus has a streamlined appearance.

A preferred embodiment of the present invention has been described above. However, the present invention is not limited to the above embodiment. It goes without saying that various changes and modifications are possible. For example, the sub region 14*c*, which is comparatively large, can be divided into two regions. In this case, the number of sub regions 14 increases by one, and the number of functions also increases by one. In all cases, each sub region 14 is allotted a single function.

In addition, an embodiment that utilizes an ultrasonic touch panel has been described. However, the present invention is not limited to ultrasonic touch panels, and touch panels of the optical type or the digital resistance film type may be employed. In an optical type touch panel, pairs of light emitting elements and light receiving elements are housed within a bezel that surrounds a detection region. Further, the image display that displays images within the main region 10 is not limited to the projector 6. Various other types of image displays, such as CRT's (Cathode Ray Tubes), LCD (Liquid Crystal Display) panels, and FED panels may be employed.

What is claimed is:

1. An information input device, comprising:
   a touch panel comprising a sensor section configured to detect contact positions on the touch panel, the sensor section being divided into a rectangular main region and at least one sub region, wherein the touch panel is an acoustic type touch panel and the sensor section comprises a plurality of reflective arrays arranged along the perimeter of the sensor section, the plurality of reflective arrays comprising a first reflective array along the main region and a second reflective array along the at least one sub region wherein the first reflective array and the second reflective array are co-linear but separated from each other by a first gap, the first gap representing a first separation between the main region and the at least one sub region, wherein first portions of surface acoustic waves are reflected by the first reflective array across the main region and second portions of surface acoustic waves pass through the first gap and are reflected by the second reflective array across the at least one sub region;
   a receiving transducer configured to receive the first portions of the surface acoustic waves and the second portions of the surface acoustic waves; and
   an image display visible through the main region of the touch panel;
      wherein the at least one sub region has a smaller area than the main region, is separated from the main region, extends along at least one edge of the main region, and has a switching function;
      wherein images are displayed by the image display and contact positions are detected in the main region; and
      wherein only the presence or absence of contact is detected in the at least one sub region.

2. An information input device as defined in claim 1, wherein the at least one sub region comprises:
   a first sub region, which is separated from, adjacent to, and extends along a first edge of the main region;
   a second sub region, which is separated from, adjacent to, and extends along a second edge of the main region perpendicular to the first edge; and
   a third sub region, which is positioned at an intersection of the directions in which the first edge and the second edge extend, and separated from the first sub region and the second sub region.

3. An information input device as defined in claim 2, wherein:
   the plurality of reflective arrays further comprises a third reflective array along the main region and a fourth reflective array along the second sub region, the third and fourth reflective arrays being co-linear but separated from each other by a second gap representing the first separation between the main region and the at least one sub region, wherein acoustic waves that pass through the second gap continue to propagate to the fourth reflective array.

4. An information input device as defined in claim 3, wherein:
   the first and second reflective arrays are parallel to the third and fourth reflective arrays.

5. An information input device as defined in claim 2, wherein:
   the plurality of reflective arrays further comprises a fifth reflective array along the main region and a sixth reflective array along the second sub region, the fifth and sixth reflective arrays being co-linear but separated from each other by a third gap representing a second separation between the main region and at least one sub region, wherein acoustic waves that pass through the third gap continue to propagate to the sixth reflective array.

6. An information input device as defined in claim 5, wherein:
   the plurality of reflective arrays further comprises a seventh reflective array along the main region and an eighth reflective array along the third sub region, the seventh and eighth reflective arrays being co-linear but separated from each other by a fourth gap representing the second separation, wherein acoustic waves that pass through the fourth gap continue to propagate to the seventh reflective array.

7. An information input device as defined in claim 1, wherein:
- the switching function allotted to any particular sub region comprises one of: a right click function, a shift key function, a control key function, a booting function, a brightness adjustment function, a vertically inverted display function, or displaying an onscreen display (OSD) menu.

8. An information input device as defined in claim 2, wherein:
- the switching function allotted to any particular sub region comprises one of: a right click function, a shift key function, a control key function, a booting function, a brightness adjustment function, a vertically inverted display function, or displaying an onscreen display (OSD) menu.

9. An information input device as defined in claim 6, wherein:
- the switching function allotted to any particular sub region comprises one of: a right click function, a shift key function, a control key function, a booting function, a brightness adjustment function, a vertically inverted display function, or displaying an onscreen display (OSD) menu.

* * * * *

UNITED STATES PATENT AND TRADEMARK OFFICE
CERTIFICATE OF CORRECTION

PATENT NO. : 8,427,423 B2
APPLICATION NO. : 11/795349
DATED : April 23, 2013
INVENTOR(S) : Masahiro Tsumura Page 1 of 1

It is certified that error appears in the above-identified patent and that said Letters Patent is hereby corrected as shown below:

Title page,
Item (86) PCT No., "PCT/JP2006/000791" should read -- PCT/JP2006/300791 --.

Signed and Sealed this
Ninth Day of July, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,427,423 B2 | Page 1 of 1 |
| APPLICATION NO. | : 11/795349 | |
| DATED | : April 23, 2013 | |
| INVENTOR(S) | : Tsumura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this
Second Day of December, 2014

Michelle K. Lee
*Deputy Director of the United States Patent and Trademark Office*